(12) United States Patent　　(10) Patent No.: US 8,672,423 B2
Shimozono　　(45) Date of Patent: Mar. 18, 2014

(54) RUBBER TRACK

(75) Inventor: Nobuo Shimozono, Zushi (JP)

(73) Assignee: Bridgestone Corporation, Tokyo (JP)

( * ) Notice: Subject to any disclaimer, the term of this patent is extended or adjusted under 35 U.S.C. 154(b) by 676 days.

(21) Appl. No.: 12/990,886

(22) PCT Filed: May 1, 2009

(86) PCT No.: PCT/JP2009/058577
§ 371 (c)(1),
(2), (4) Date: Jan. 21, 2011

(87) PCT Pub. No.: WO2009/136607
PCT Pub. Date: Nov. 12, 2009

(65) Prior Publication Data
US 2011/0181103 A1　　Jul. 28, 2011

(30) Foreign Application Priority Data

May 8, 2008　(JP) ................................. 2008-122417

(51) Int. Cl.
*B62D 55/253*　　(2006.01)
(52) U.S. Cl.
USPC ............ 305/167; 305/165; 305/170; 305/177
(58) Field of Classification Search
USPC .................. 305/165–167, 170–174, 176, 177
IPC ...................................................... B62D 55/253
See application file for complete search history.

(56) References Cited

U.S. PATENT DOCUMENTS

| 6,170,925 | B1 * | 1/2001 | Ono .............................. | 305/177 |
| 7,014,279 | B2 * | 3/2006 | Watanabe et al. ............. | 305/179 |
| 7,547,079 | B2 * | 6/2009 | Choi ............................. | 305/177 |
| 2007/0114845 | A1 * | 5/2007 | Choi ............................. | 305/177 |
| 2009/0102283 | A1 * | 4/2009 | Choi ............................. | 305/177 |
| 2011/0163596 | A1 * | 7/2011 | Shimozono .................. | 305/167 |

FOREIGN PATENT DOCUMENTS

| JP | 7-117740 A | 5/1995 |
| JP | 2001-48067 A | 2/2001 |
| JP | 2005-1432 A | 1/2005 |
| JP | 2007-210478 A | 8/2007 |

OTHER PUBLICATIONS

International Search Report dated Jun. 16, 2009 (4 pages).

(Continued)

*Primary Examiner* — Ruth Ilan
(74) *Attorney, Agent, or Firm* — Sughrue Mion, PLLC

(57) ABSTRACT

A rubber track having: an endless rubber elastic body 1; a plurality of cores 2 arranged at predetermined pitches in the rubber elastic body so as to extend in a width direction of the rubber elastic body; a reinforcing layer extending in the rubber elastic body so as to surround the cores 2; and a plurality of lugs 4 formed on an outer peripheral surface of the rubber elastic body 1 at predetermined intervals and acting on a road surface, the rubber track comprising; a thick wall rubber portion, located between the lugs on the outer peripheral surface of the rubber elastic body, that covers an end portion of each of the cores and communicates with lugs located therebefore and thereafter, wherein an inclined plane of the thick wall rubber portion facing obliquely outward whose thickness gradually decreases toward a side edge side of the rubber elastic body is coplanar with an inclined plane of each of the lugs on the side edge side of the rubber elastic body.

3 Claims, 5 Drawing Sheets

(56) References Cited

OTHER PUBLICATIONS

Chinese Office Action dated Nov. 13, 2012 issued in Chinese Application No. 200980116515.5.
Office Action issued in counterpart Chinese Application No. 20090116515.5, dated May 15, 2012.
Supplementary European Search Report issued in European Application No. 09742731.4 dated May 31, 2011.
Chinese Office Action, dated May 2, 2013, issued in corresponding Chinese Patent Application No. 200980116515.5.
Japanese Office Action dated Oct. 2, 2012 issued in Japanese Patent Application No. 2008-122417.

* cited by examiner

FIG. 4
(a)
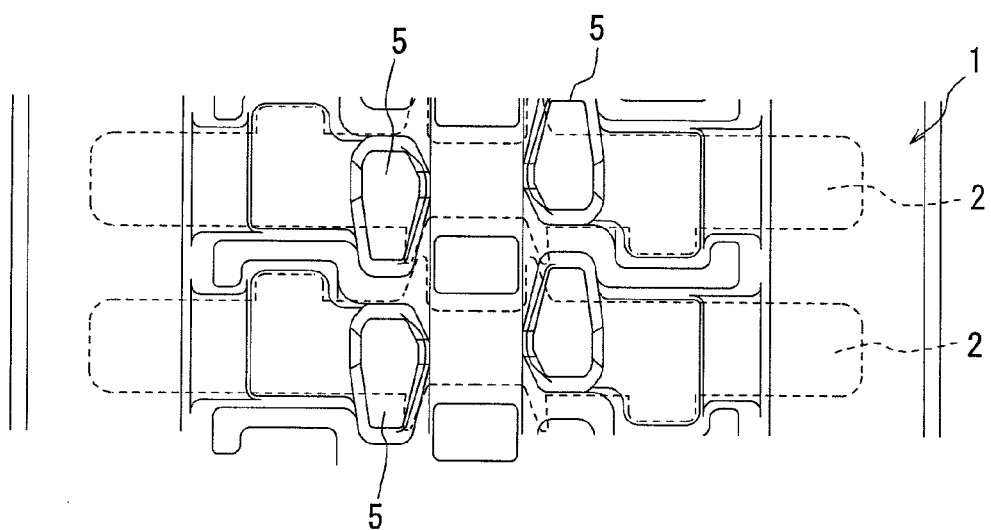
(b)
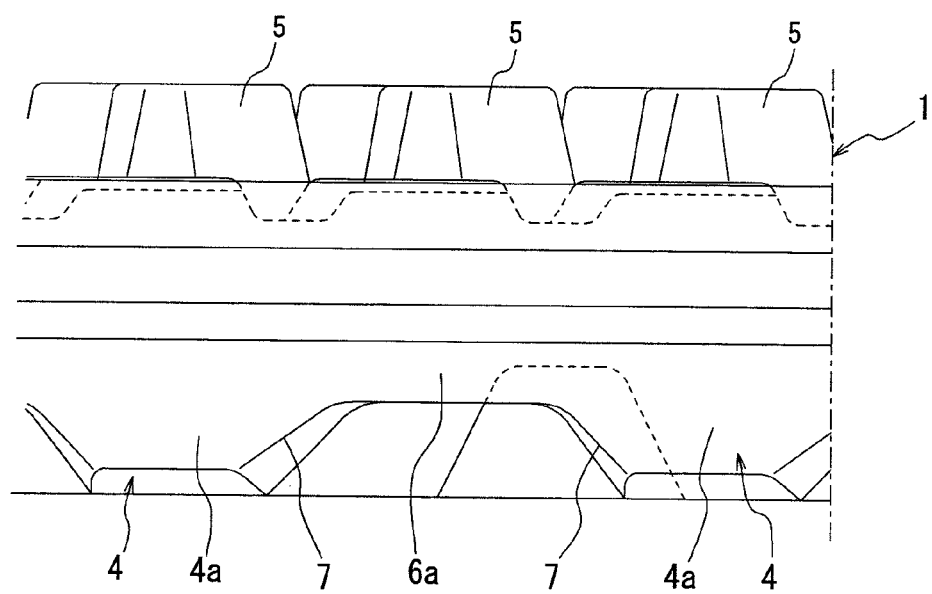

FIG. 5
(a) (Prior Art)
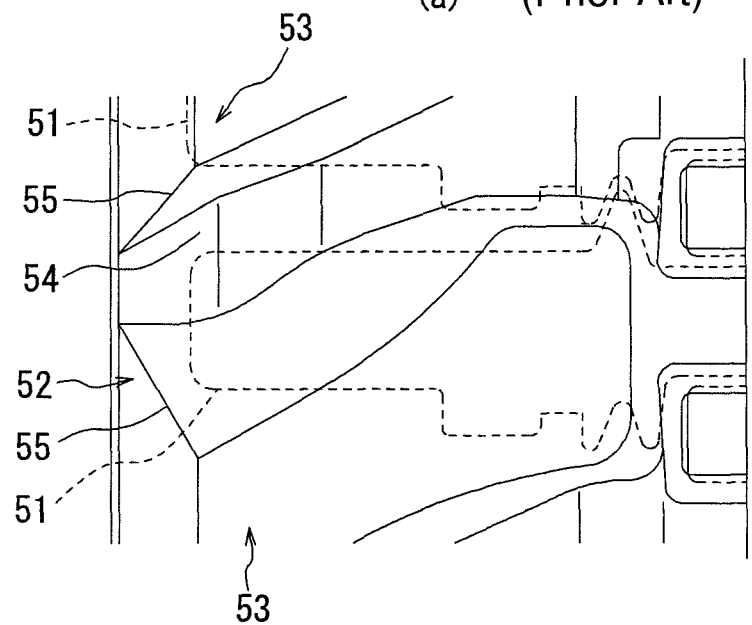
(b) (Prior Art)
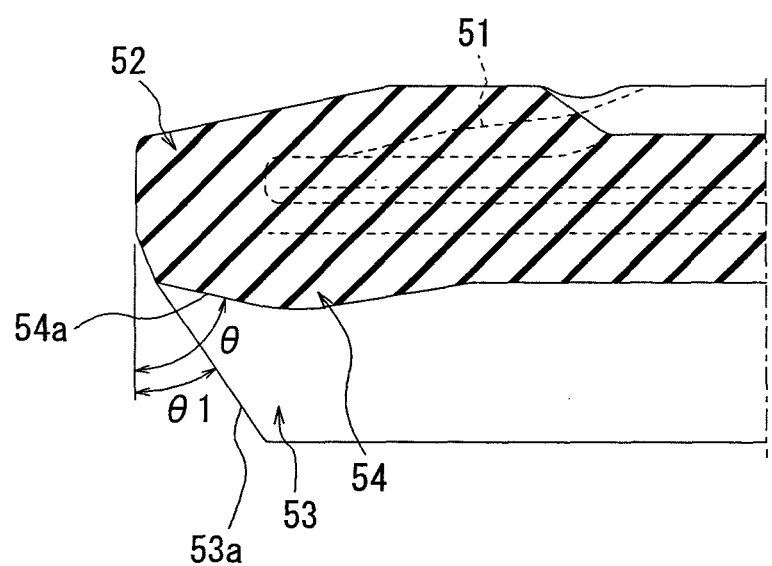

RUBBER TRACK

TECHNICAL FIELD

The present invention relates to a rubber track having an endless rubber elastic body; plural cores arranged at predetermined pitches in the rubber elastic body so as to extend in the width direction of the rubber elastic body; a reinforcing layer extending in the rubber elastic body so as to surround the cores; and plural lugs formed on the outer peripheral surface of the rubber elastic body at predetermined intervals and acting on a road surface. In particular, the present invention proposes a technique that effectively prevents occurrence of cracks at a portion of the rubber elastic body corresponding to an end portion of each of the cores, which is located on the outer peripheral surface side of the rubber track and is not covered with the rubber.

BACKGROUND ART

For example, in a so-called short-pitch-type rubber track for construction machines in which plural cores are arranged at short pitches, when lugs are arranged on the outer peripheral surface of the rubber track in consideration of cut resistance or vibration reducing property, an end portion of one core among two cores adjacent to each other in the circumferential direction is likely to become a portion not covered with the lug. As a result, at the end portion of the core not covered with the lug, a covering thickness of the core covered with the rubber elastic body is thinner, which leads to a large stepwise difference in rigidity between a portion with the core and a portion without the core. Therefore, there existed a problem that, when the rubber track travels, strain is concentrated between these portions, and cracks called an edge-cutting are likely to occur at the portion corresponding to the end portion of the core of the rubber elastic body.

To solve such a problem as this, Patent Literature 1 proposes that a ridge 54 extending between lugs 53 therebefore and thereafter be formed on the outer peripheral surface of a rubber elastic body 52 so as to correspond to right and left end portions of a core 51, as exemplarily shown in FIG. 5, which relates to a developed plan view and a sectional view in the width direction on the outer peripheral surface side of the half width of a rubber track. With this technique, the ridge 54 is formed on the outer peripheral surface of the rubber elastic body 52 so as to correspond to the right and left ends of the core 51 where the edge-cuttings are most likely to occur, whereby the strain occurring at the right and left ends of the core is made dispersed, and the occurrence of cracks at the rubber elastic body 52 can be prevented.

RELATED ART DOCUMENT

Patent Literature

Patent Literature 1: JP 2005-1432 A

SUMMARY OF THE INVENTION

Problems to be Solved by the Invention

However, as can be clearly understood from the sectional view exemplarily shown in FIG. 5(b), with the proposed technique, an inclined angle θ of an inclined plane 54a of the ridge 54 whose thickness gradually decreases toward the side edge side of the rubber elastic body 52, with respect to a vertical plane is significantly large as compared with a similar inclined angle θ1 of an inclined face 53a on the side edge side of the rubber elastic body. Therefore, even at the portion where the ridge 54 is formed, the thickness of the rubber covering the end portion of the core 51 is significantly thin as compared with that at the lug 53, and hence, the crack directly occurring at the rubber elastic body 52 corresponding to the end edge of the core 51 cannot be sufficiently prevented when the side edge of the rubber track is rubbed with a curbstone or the like. Further, because of the difference between the angles θ, θ1 described above, a spur 55 serving as an angled portion adjacent to the inclined face 53a of the lug 53 is made outstanding throughout the entire length thereof. The spur 55 is likely to be caught by the curbstone or the like, which causes the strain to be concentrated on the portion corresponding to the end edge of the core. This further promotes the generation of cracks of the rubber elastic body 52 as described above.

To solve such a problem as this, the present invention provides a rubber track that can effectively prevent occurrence of a crack at a portion of a rubber elastic body corresponding to an end edge, which is not covered with a lug, of a core extending in a width direction of the rubber elastic body.

Means to Solve the Problems

The present invention provides a rubber track having: an endless rubber elastic body; a plurality of cores arranged at predetermined pitches in the rubber elastic body so as to extend in a width direction of the rubber elastic body; a reinforcing layer extending in the rubber elastic body so as to surround the cores and often including a steel cord reinforcing layer; and a plurality of lugs formed on an outer peripheral surface of the rubber elastic body at predetermined intervals and acting on a road surface, the rubber track comprising: a thick wall rubber portion, located between the lugs on the outer peripheral surface of the rubber elastic body, that covers an end portion of each of the cores and communicates with lugs located therebefore and thereafter so as to extend, for example, in a circumferential direction, wherein an inclined plane of the thick wall rubber portion facing obliquely outward whose thickness gradually decreases toward a side edge side of the rubber elastic body is coplanar with an inclined plane of each of the lugs on the side edge side of the rubber elastic body.

As used herein, the "inclined plane facing obliquely outward" may be a flat and inclined plane, or may be an upwardly convexed plane or a downwardly convexed plane in the cross section of the track. In these cases, it is preferable for a radius of curvature to be 50 mm or more in the same cross section.

Preferably, an outer surface of the thick wall rubber portion is a flat plane. Further, preferably, the following dimensions in a cross section in a width direction of the rubber track satisfy a relative relation of $L/2 \leq l1 \leq L$, and $L < l2 < W$, where W is a width of the rubber track, L is a length of the core, and l1 and l2 are an inner distance and a outer length of the thick wall rubber portion, respectively. Note that, in this case, both the inner distance and the outer length of the thick wall rubber portion are measured between respective shoulder portions where the thickness of the thick wall rubber portion begins to decrease.

Yet further, preferably, in the widthwise cross section of the rubber track, in a case where a thickness-reduction state of the thick wall rubber portion on a center portion side of each of the cores is a flat and inclined plane, an angle of the flat and inclined plane with respect to a line normal to the thick wall rubber portion adjacent to the flat and inclined plane is in the range of 30° to 80°. Then, in a case where the thickness-reduction state is an upwardly convexed plane, it is preferable that a radius of curvature of the upwardly convexed plane be in the range of 10 mm to 150 mm.

Effects of the Invention

According to the rubber track of the present invention, the inclined plane facing obliquely outward of the thick wall rubber portion extending in the circumferential direction, the thickness of which gradually decreases toward the side edge side of the rubber elastic body, that is, the inclined plane facing obliquely outward of the rubber elastic body is coplanar with the inclined plane of each of the lugs similar to the side edge side of the rubber elastic body. This allows the thickness of the thick wall rubber portion to be sufficiently large. With this configuration, when the side edge of the thick wall rubber portion provided between the lugs is rubbed with the curbstone or the like, or even when the thick wall portion rides over a protrusion on the road surface, the strain generated at the rubber elastic body can be effectively dispersed at a portion corresponding to the end edge of the core, whereby the occurrence of the crack at the rubber elastic body can be effectively prevented.

Further, in the rubber track, the inclined plane of the thick wall rubber portion is coplanar with the inclined plane of each of the lugs, whereby the respective lugs are less likely to be caught by the curbstone or the like. Additionally, the entire length of a spur formed by the angled portion adjacent to the inclined plane of the lug becomes shorter at the base portion side of each of the lugs by an amount corresponding to the inclined plane of the thick wall rubber portion, as compared with the proposed technique described above, whereby the possibility that the spur is caught by the curbstone or the like can be advantageously reduced, while the protruding height of the lugs is being secured to be constant. Consequently, the occurrence of cracks at the portion of the rubber elastic body corresponding to the end edge of the core can be further effectively prevented.

In this regard, in a case where the outer surface of the thick wall rubber portion is a flat plane, the contact pressure can be decreased. Hence, in the case of the flat plane as described above, durability of the thick wall rubber portion at the time when the rubber track is rubbed with the curbstone or the like can be improved, and the occurrence of the crack at the end of the core can be effectively prevented.

Further, stress concentration on the end portion of the core is effectively alleviated, and the occurrence of the crack at the end of the core can be prevented, in a case where, in the widthwise cross section of the rubber track, the following dimensions satisfy a relative relation of $L/2 \leq l1 \leq L$, and $L < l2 < W$, where W is a width of the rubber track is, L is a length of the core, and l1 and l2 are an inner distance and a outer length of the thick wall rubber portion, respectively.

Yet further, in a case where the thickness-reduction state of the thick wall rubber portion on a center portion side of the core is a flat and inclined plane in the widthwise cross section of the rubber track, an angle of the flat and inclined plane with respect to a line normal to the contour of the thick wall rubber portion adjacent to the inclined plane may be set in the range of 30° to 80°. In a case where the thickness-reduction state is an upwardly convexed plane, the radius of curvature of the upwardly convexed plane may be in the range of 10 mm to 150 mm. With the configurations above, the thick wall rubber portion is less likely to be caught by the curbstone or the like, whereby the occurrence of crack at the end of the core can be further effectively prevented.

BRIEF DESCRIPTION OF THE DRAWINGS

FIG. 4 are a developed plan view of an inner peripheral surface and a partial side view of the rubber track; and, FIG. 5 are diagrams showing a proposed technique.

MODE FOR CARRYING OUT THE INVENTION

Hereinbelow, an embodiment of the present invention will be described with reference to the drawings.

Figure 1:
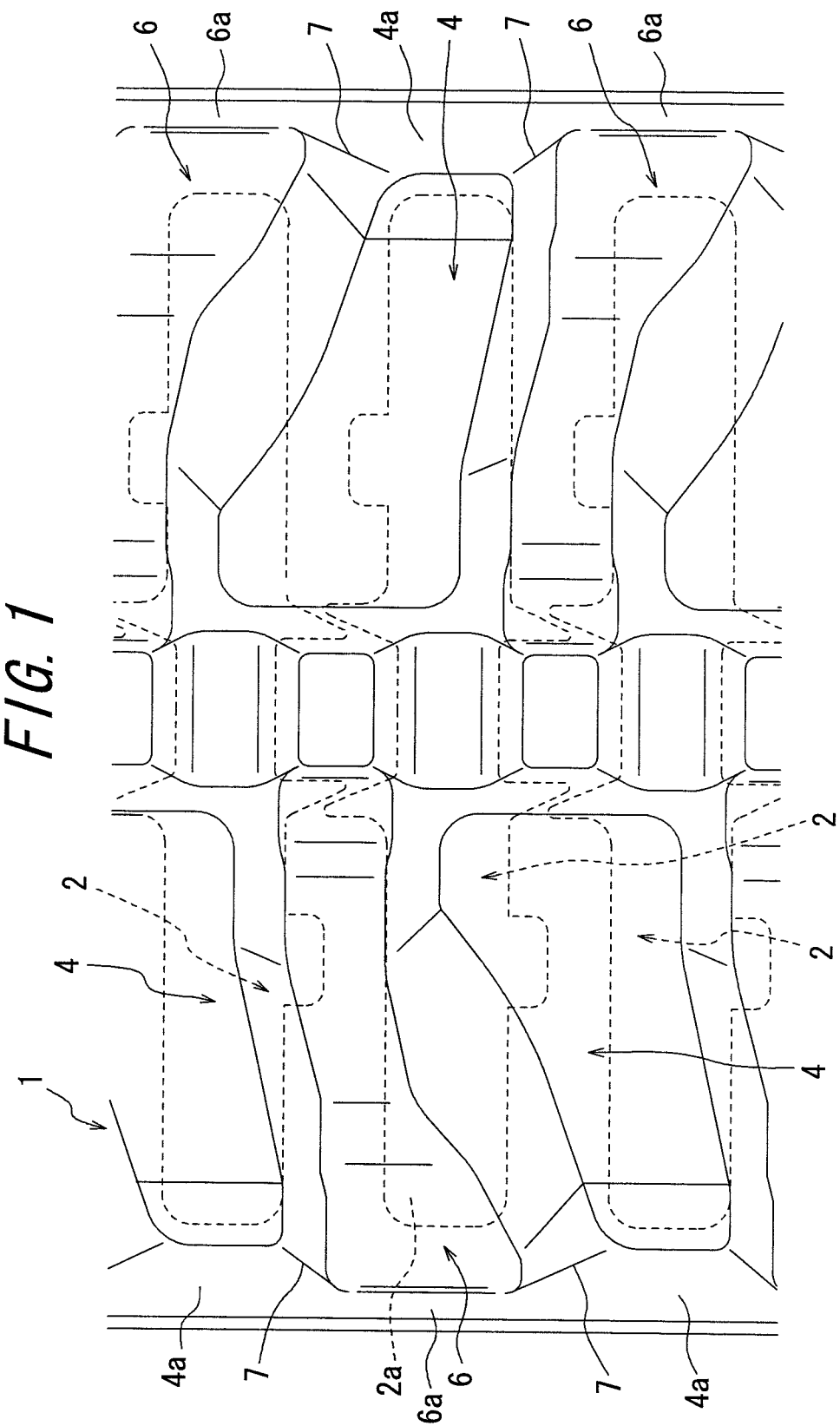
FIG. 1 is a developed plan view of an outer peripheral surface of a rubber track.
Figure 2:
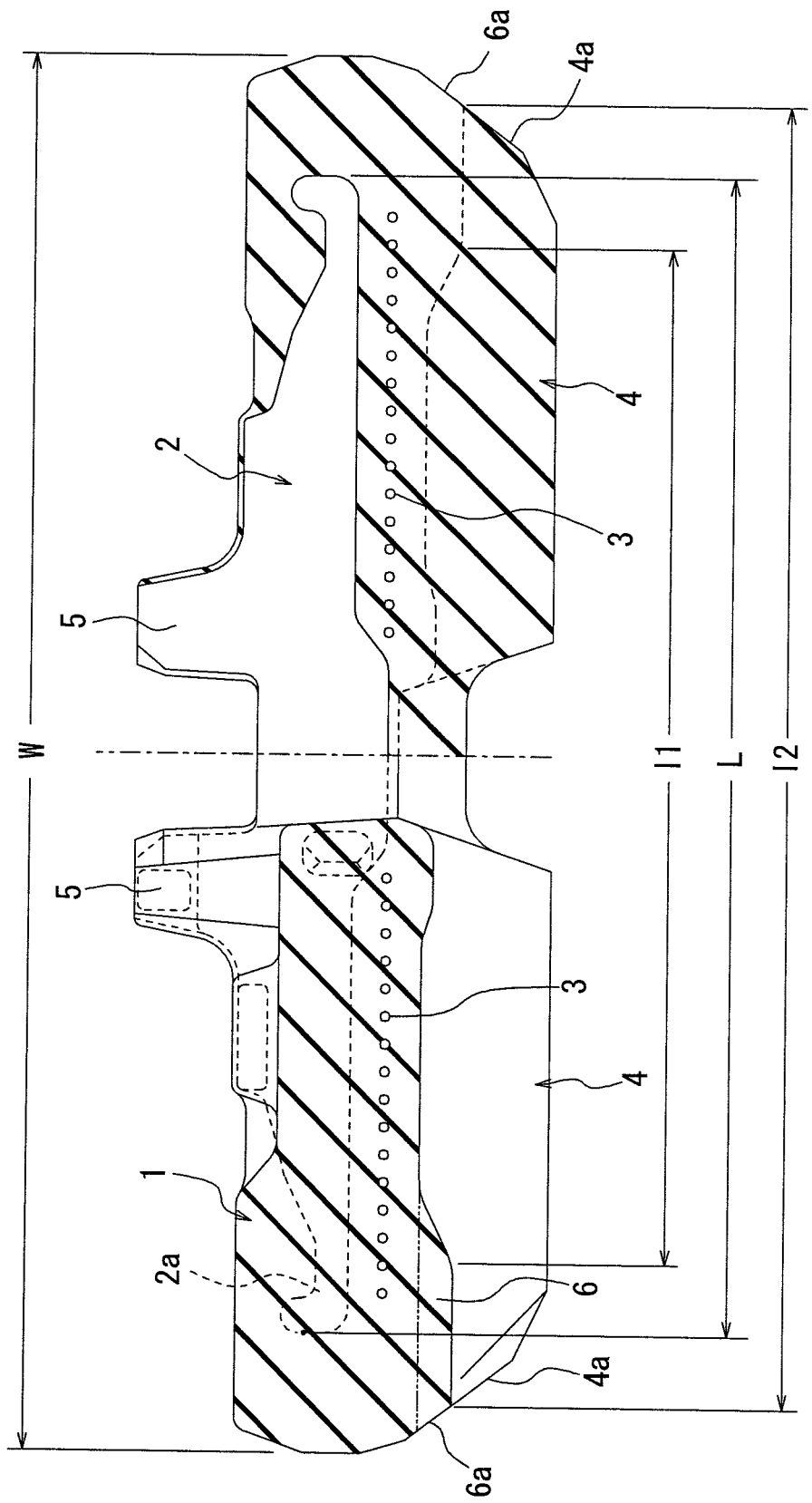
FIG. 2 is a sectional view in the width direction of the rubber track.

FIG. 1 is a developed plan view of an outer peripheral surface of a rubber track, and FIG. 2 is a sectional view in the width direction of the rubber track.

Further, FIG. 4(*a*) and FIG. 4(*b*) are a developed plan view of an inner peripheral surface and a partial side view of the rubber track, respectively.

The rubber track is provided with a rubber elastic body 1 connecting endlessly in the circumferential direction. In the rubber elastic body 1, plural cores 2 are embedded and arranged at predetermined pitches so as to extend in the width direction of the rubber elastic body 1. Further, there is disposed a reinforcing layer 3 extending in the circumferential direction in the rubber elastic body 1 so as to surround the cores 2, most of which contain a steel-cord reinforcing layer. Yet further, plural lugs 4 formed at predetermined intervals in the circumferential direction and acting on a road surface are provided to the rubber elastic body 1, thereby on the outer peripheral surface of the rubber track. On the inner peripheral surface thereof and between roller path surfaces, there are provided projections 5 that are engaged with idler tumblers (idlers) to apply tension to the rubber track for the purpose of maintaining a smooth travel.

In this embodiment, as can be clearly understood from FIG. 1 and FIG. 2, at a position between the lugs and on the outer peripheral surface of the rubber elastic body 1, there is provided a thick wall rubber portion 6 that covers an end portion 2*a* of the core 2; extends in the circumferential direction between the lugs 4 located before and after the thick wall rubber portion 6; and, communicates with the lugs 4. At a portion of the thick wall rubber portion 6 on a side edge side of the rubber elastic body 1, there is provided an inclined face 6*a* facing obliquely outward such that the thickness thereof gradually decreases toward the side edge side of the rubber elastic body 1. The inclined face 6*a* is disposed at the portion of each of the lugs 4 on the side edge side of the rubber elastic body 1, and is coplanar with an inclined face 4*a* facing obliquely outward and decreasing its thickness toward the side edge side of the rubber elastic body 1.

Note that each inclined angle of the respective inclined face 4*a*, 6*a* with respect to the vertical plane may be, for example, in the range of 45-90°.

As described above, with this configuration, the thickness of the thick wall rubber portion 6 covering the end portion 2*a* of the core 2 can be sufficiently large; a step can be removed from between the inclined face 6*a* of the thick wall rubber portion 6 and the lug inclined face 4*a*; the length of a spur 7 formed by angled portions adjacent to and sandwiching the lug inclined face 4*a* can be shortened, and the like, whereby the occurrence of cracks at the rubber elastic body portion corresponding to the end edge of the core can be effectively prevented.

Figure 3:
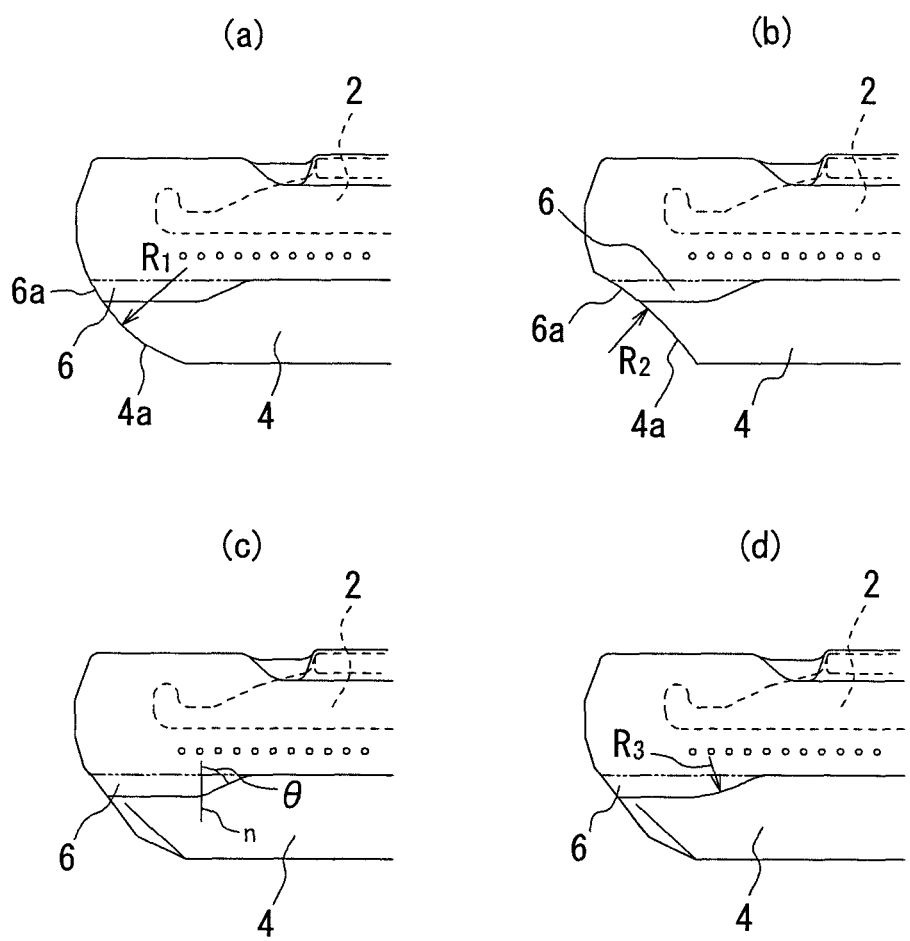
FIG. 3 are sectional views in the width direction of the rubber track, exemplarily showing thickness-reduction states at a thick wall rubber portion.

Incidentally, the inclined face 6a facing obliquely outward of the thick wall rubber portion 6 is not limited to a flat and inclined face as shown in FIG. 1. That is, the inclined face 6a facing obliquely outward of the thick wall rubber portion 6 may be a curved plane facing obliquely outward and be convex or concave shape as shown in FIG. 3(a) and FIG. 3(b), provided that it is coplanar with the inclined face 4a of the lug 4 facing obliquely outward. In any of the cases described above, it is preferable that the radius of curvature R1, R2 in a cross section of the track be 50 mm or more.

More preferably, the rubber track as described above is formed such that the outer surface of the thick wall rubber portion 6 is a flat plane as shown in FIG. 2. Further preferably, the thick wall rubber portion 6 is disposed such that the following dimensions satisfy a relative relation of $L/2 \leq l1 \leq L$, and $L < l2 < W$, where W is a width of the rubber track, L is a length of the core, and l1 and l2 are an inner distance and a outer length of the thick wall rubber portion, respectively.

Note that, in this case, both the inner distance and the outer length of the thick wall rubber portion 6 are measured between shoulder portions where the thickness of the thick wall rubber portion 6 begins to decrease.

Further, more preferably, in a case where the thickness-reduction state of the thick wall rubber portion 6 on a center portion side of the core 2 is a flat and inclined plane as shown in FIG. 3(c), an angle θ of the flat and inclined plane with respect to a line n normal to a portion of the thick wall rubber portion that is adjacent to the flat and inclined plane and whose thickness does not decrease is in the range of 30° to 80°. On the other hand, in a case where the thickness-reduction state is an upwardly convexed plane as shown in FIG. 3(d), it is preferable that the radius of curvature R3 of this convexed plane be in the range of 10 mm to 150 mm.

When the radius of curvature R3 exceeds 150 mm, the volume of rubber inevitably increases, and the height of the lug looks relatively low, which inevitably leads to deterioration of appearance.

EXPLANATION OF REFERENCE CHARACTERS

1 Rubber elastic body
2 Core
2a End portion
3 Reinforcing layer
4 Lug
4a Inclined face
5 Projection
6 Thick wall rubber portion
6a Inclined face
7 Spur
L Length of core
E End edge of core

The invention claimed is:

1. A rubber track having: an endless rubber elastic body; a plurality of cores arranged at predetermined pitches in the rubber elastic body so as to extend in a width direction of the rubber elastic body; a reinforcing layer extending in the rubber elastic body so as to surround the cores; and a plurality of lugs formed on an outer peripheral surface of the rubber elastic body at predetermined intervals and acting on a road surface, the rubber track comprising; a thick wall rubber portion, located between the lugs on the outer peripheral surface of the rubber elastic body, that covers an end portion of each of the cores and communicates with lugs located therebefore and thereafter, wherein an inclined plane of the thick wall rubber portion facing obliquely outward whose thickness gradually decreases toward a side edge side of the rubber elastic body is coplanar with an inclined plane of each of the lugs on the side edge side of the rubber elastic body, and an outer surface of the thick wall rubber portion is a flat plane extending substantially parallel to the width direction of the rubber elastic body.

2. The rubber track according to claim 1, wherein the following dimensions in a cross section in a width direction of the rubber track satisfy a relative relation of $L/2 \leq l1 \leq L$, and $L < l2 < W$, where W is a width of the rubber track, L is a length of the core, and l1 and l2 are an inner distance and a outer length of the thick wall rubber portion, respectively.

3. The rubber track according to claim 1, wherein in the widthwise cross section of the rubber track, in a case where a thickness-reduction state of the thick wall rubber portion on a center portion side of each of the cores is a flat and inclined plane, an angle of the flat and inclined plane with respect to a line normal to the thick wall rubber portion adjacent to the flat and inclined plane is in the range of 30° to 80°, and, in a case where the thickness-reduction state is an upwardly convexed plane, a radius of curvature of the upwardly convexed plane is in the range of 10 mm to 150 mm.

* * * * *